United States Patent

Ragsdale et al.

[15] 3,643,023

[45] Feb. 15, 1972

[54] DIFFERENTIAL PHASE MODULATOR AND DEMODULATOR UTILIZING RELATIVE PHASE DIFFERENCES AT THE CENTER OF THE MODULATION PERIODS

[72] Inventors: Robert G. Ragsdale, Hollywood; Paul E. Payne, Fort Lauderdale, both of Fla.

[73] Assignee: Milgo Electronic Corporation, Miami, Dade County, Fla.

[22] Filed: Mar. 1, 1968

[21] Appl. No.: 709,761

[52] U.S. Cl. ................................178/67, 325/163, 325/320

[51] Int. Cl. ................................H04l 27/24

[58] Field of Search ....................325/30, 41, 39, 42, 45, 163, 325/326; 179/2; 178/66, 67, 68, 51

[56] References Cited

UNITED STATES PATENTS

| | | | |
|---|---|---|---|
| 2,852,607 | 9/1958 | Treadwell | 325/39 X |
| 2,977,417 | 3/1961 | Doelz et al. | 178/51 |
| 3,128,342 | 4/1964 | Baker | 178/67 X |
| 3,128,343 | 4/1964 | Baker | 178/67 |
| 3,466,392 | 9/1969 | Calfee et al. | 178/66 |

*Primary Examiner*—Benedict V. Safourek
*Assistant Examiner*—R. S. Bell
*Attorney*—Jackson and Jones

[57] ABSTRACT

Digital data transmission at a very high bit rate through randomly selected voice-grade telephone lines by the use of a transmitter which includes digital differential angle modulation; and a receiver which includes digital differential angle demodulation is disclosed. Binary data wherein the individual bits are represented by a discrete level format during bit cell times is stored in multibit groups of randomly varying data patterns. Each multibit group is converted from its digital level format to a predetermined phase level format which includes a plurality of different phase, or angle, increments. At the transmitter a divider circuit receives a high-frequency signal which is many times higher than the bit rate of the data to be transmitted, and divides it into an intermediate frequency square wave signal which is still many times higher than the bit rate. The predetermined phase levels representative of each multibit group are compared with divider output taps by a comparison circuit which selectively alters the dividing operation so that an information-representing phase-shifted intermediate frequency signal is emitted. This information-representing phase-shifted signal is filtered and translated down to a low-frequency analog signal which is passed through a narrow band pass communication link exhibiting a linear phase over the band pass width.

At the receiver end of the data communication system, the narrow band pass limited signal is translated up to the intermediate frequency and a clock signal is derived from the information-representing envelope. This clock signal is employed to synchronously gate a high-frequency counter output into a detector circuit which samples a precise portion of a phase-shifted signal containing the information to be ascertained. Two separate storage registers in the detector circuit receive successive counter output valves depending upon the phase sampled from the precise portion of the information-containing signal. A parallel adder determines the difference between successive counts, each count of which is characteristic of the information-representing phase change originally received during the interval in question. An encoder converts the phase-change signal as emitted by the parallel adder, back to its original digital data level format.

25 Claims, 9 Drawing Figures

| CODE | |
|---|---|
| DATA | φ ANGLE |
| 0 0 1 | 315° |
| 0 0 0 | 270° |
| 1 0 0 | 225° |
| 1 0 1 | 180° |
| 1 1 1 | 135° |
| 1 1 0 | 90° |
| 0 1 0 | 45° |
| 0 1 1 | 0° |

NAND GATE TRUTH TABLE 250

| INPUTS | | | | OUTPUT |
|---|---|---|---|---|
| T | T | T | = | F |
| T | F | T | = | T |
| F | F | T | = | T |

NOR GATE TRUTH TABLE 260

| INPUT | | | | OUTPUT |
|---|---|---|---|---|
| F | F | F | = | T |
| F | T | T | = | T |
| T | F | T | = | T |
| T | T | T | = | F |

DIFFERENTIAL PHASE MODULATOR AND DEMODULATOR UTILIZING RELATIVE PHASE DIFFERENCES AT THE CENTER OF THE MODULATION PERIODS

CROSS-REFERENCE TO RELATED APPLICATIONS

This application is an improvement over a related application entitled "Band Limited Telephone Line Data Communication System," Ser. No. 565,214 filed July 14, 1966, now U.S. Pat. No. 3,524,023, by inventor Sang Y. Whang and assigned to the same assignee, as is the present application.

Further, this application is related to two other applications filed concurrently herewith and assigned to the same assignee as is the present application. Such other applications are entitled "Derived Clock From Carrier Envelope" having Ser. No. 709,609, now U.S. Pat. No. 3,564,412, filed on even date herewith by inventor Sang Y. Whang, et al. and assigned to the same assignee as is the present application; and an application entitled "Equalization Circuit," having Ser. No. 709,608, now U.S. Pat. No. 3,550,005, filed on even date herewith by inventor Sang Y. Whang and assigned to the same assignee as is the present application.

BACKGROUND OF THE INVENTION

1. Field of the Invention

The field of this invention includes communication systems for digital data and particularly includes such communication systems employing United States commercial, military and foreign telephone lines and associated telephone circuitry as randomly selected in various combinations for data transmission.

DESCRIPTION OF THE PRIOR ART AND SUMMARY OF THE INVENTION

Digital data transmission over voice-grade telephone lines and associated telephone circuits is a well-known art. In general, all manufacturers seek to customize the unconditioned voice-grade telephone lines by complicated and time-consuming equalization of the amplitude and delay characteristics over a broad band of frequencies to be encountered in connection with the assigned rates which are to be transmitted over the telephone lines.

The modem of this application is particularly suited for system approaches utilizing narrow bandwidth limiting of signals to be transmitted, and provides a unique method and apparatus for generating angle modulated square wave signals and for demodulating square wave signals with improved reliability and accuracy. In contradistinction, prior art communication techniques have employed, at the transmitter, selective gating of analog signals all generated with predetermined relative phase differences; and have employed at the receiver a differential phase keying demodulation technique which employs analog signal wave forms. Such analog-type systems, although suitable for many applications, are generally susceptible to errors through erroneous phase detection in that a limited number of cycles are available for comparison purposes. In addition, such analog systems are susceptible to noise and normally involve complicated and costly equipment for the large number of relatively small angle increments of this system.

In those known and limited instances in the prior art wherein dividers are employed to obtain phase shifts, each given phase angle requires an associated divider stage, whereas in my invention at least eight equal angle increments are readily available by simultaneous and selective control of three divide-by-two stages in a divider circuit. Simultaneous logic control of these three stages provides high-speed transmitter operation together with improved accuracy not heretofore known by the prior art.

At the receiver of my invention a narrow band-limited analog signal which includes information-representing phase shifts is translated up to an intermediate frequency and squared up for detection. Detection of phase shifts is performed by a synchronized high-speed counter which is gated precisely at the center of an information-representing interval so as to read out a count coincident with the first zero crossing of the phase shift to be ascertained. This first count is stored in one register. At the center of a subsequent information-representing interval the synchronized counter is again gated to obtain a second count coincident with the first zero crossing of the next phase shift to be ascertained. This second count is stored in a second register and a comparison of both counts yields an amount indicative of the phase difference between both intervals and thus, indicative of information represented thereby.

Another feature of this invention introduces a constant angle offset in the comparison circuit. This constant angle offset is equal to substantially one-half of the predetermined angle amounts employed to represent different multibit data patterns. Such an offset serves to avoid unnecessary counter activity in the higher order counting stages in response to very small angle shifts in the received information-representing signal.

BRIEF DESCRIPTION OF THE DRAWING

The foregoing principles and features of this invention may more fully be appreciated by reference to the accompanying drawing in which.

DESCRIPTION OF THE PREFERRED EMBODIMENT

Figures 1, 2:
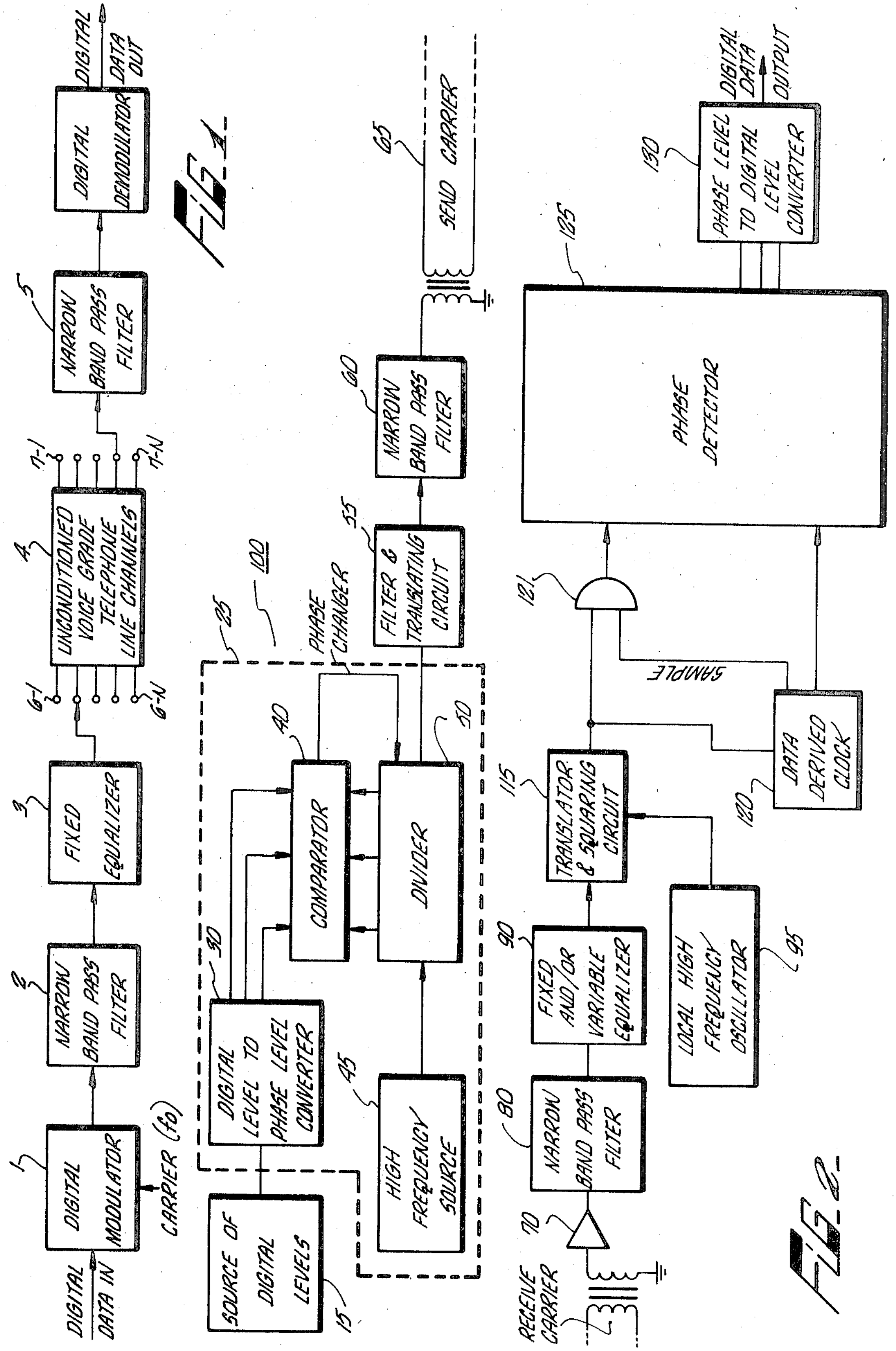
FIG. 1 is a block diagram of a digital data communication system incorporating the principles of the invention described and claimed in the aforegoing-referenced earlier filed patent application.
FIG. 2 is a block diagram of a digital data communication system incorporating the transmitter and receiver principles of the present invention.

Turning now to the drawings, the broad aspects of the invention described and claimed in the earlier referenced patent application are disclosed in the block diagram of FIG. 1. Reference to the earlier filed application may be made if full details of the earlier claimed invention are required. Briefly, however, the block diagram of FIG. 1 depicts a digital data input, such as that normally provided by a computer or other digital data source, which data is applied to a digital modulator 1.

Output signals from digital modulator 1 are band-limited in filter 2, equalized in a fixed equalizer 3, and passed through a randomly selected telephone line channel. It should be understood that such a telephone line channel normally includes exchange lines, long and short haul lines and the associated switching networks necessary to establish a completed communication link from the transmitter to the receiver. The various telephone lines 6–1 through 6–N, and the lines 7–1 through 7–N it should be understood are selected by local and/or remote telephone switching equipment in accordance with availability and other telephone control priority criteria. These telephone line channels are typically considered as unconditioned voice grade in that they are unequalized or uncompensated telephone circuits which are generally available for voice or teletype communications as well as available for data transmission utilizing the principles of this invention.

At the receiver portion of FIG. 1, the band-limited signals are again recovered and passed through a digital demodulator to restore the digital levels.

The digital modulator of FIG. 1 is preferably an angle modulator, i.e., one which modulates by phase or frequency differences. Output signals from the digital modulator are in the form of a carrier signal which is varied in phase or frequency in accordance with the digital levels supplied from the digital data input. The digital modulated signals from modulator 1 are band-limited by a narrow band-pass filter, which band-pass filter, in conjunction with band-pass filter 5 at the receiver, form a composite network having a linear phase. The band-pass width is defined by 1/T Hz. with its center frequency at $f_o$ which is the carrier frequency of the digital modulator 1. These bandwidth characteristics provide an envelope shape particularly useful for clock derivation and information storage. For example, the envelope of one digital modulated signal after it has passed through the fixed equalizer 3 and a randomly selected telephone channel includes a peaked amplitude at the middle of its assigned modulation period T, and the amplitude of the envelope drops towards zero at the boundaries of adjacent preceding and successive modulation periods as shown by envelope 110 in FIG. 5A.

The technique of data transmission employed in this invention consists of a differential eight-phase modulated signal. Such signals contain eight different phase differences of 45° each. Multibit groups of digital levels are assigned a given phase, and thus a detection and comparison of a given phase with a subsequent phase provides a ready demodulation scheme as described in more detail hereinafter with respect to FIG. 2 and other figures illustrating one representative embodiment of this invention.

Turning now to FIG. 2, a block diagram of an improved square wave phase shift modulator 25 is shown in the transmitter channel 100. This digital modulator 25 includes a digital level-to-phase level converter 30 which is adapted to receive series digital level signals from a source of digital data 15. Such digital data may be typically of the digital format wherein one binary weighted value is represented by one discrete level and another binary weighted value is represented by a second discrete level. The digital level-to-phase level converter 30 will typically receive multibit groups of digital data in serial form, temporarily store such multibit groups, and emit a phase which is representative of the data content for the stored group.

Figures 3, 3A:
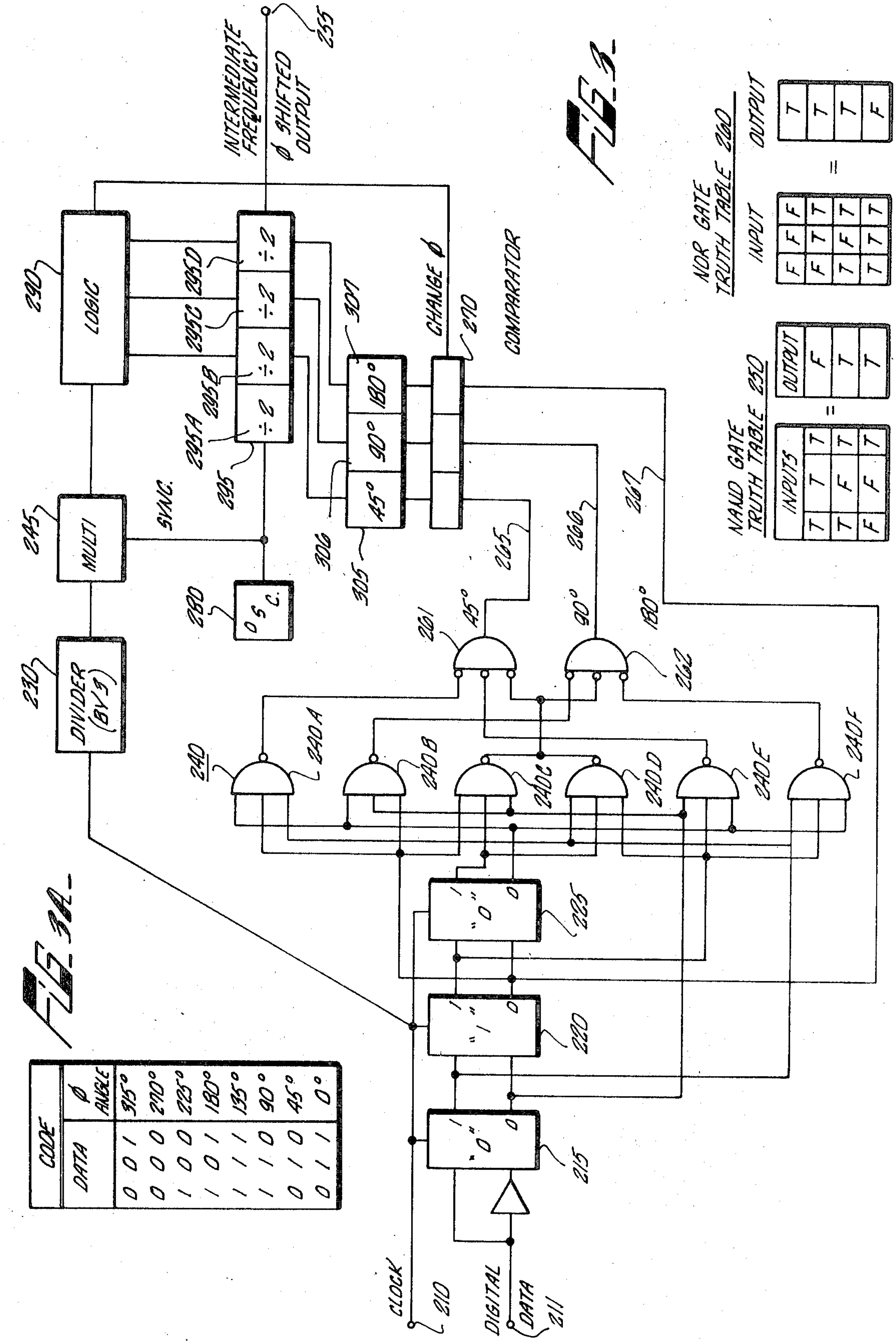
FIG. 3 is a combined block diagram and circuit schematic depicting a digital level-to-phase-level converter, and a high-frequency divider for generating phase-shifted signals.
FIG. 3A is a chart depicting assigned phase angle increments for different groups of multibit data patterns.

One typical multibit code particularly adaptable for this invention, is shown in FIG. 3A and includes a multibit grouping which is based on three binary bits. As is shown in FIG. 3, a given phase angle is assigned to each available pattern of ZEROS and ONES within each group of three binary bits. There are only eight different bit patterns available for a three bit grouping. Thus, each individual bit pattern has assigned thereto a phase angle which differs by at least 45° from all other patterns. The phase outputs are thus in multiples of 45° wherein the multiples are 0, 1, 2, 3, etc., through 7.

In accordance with my invention, these different phase angles may be conveniently represented by three output leads from circuit 30, FIG. 2, having assigned values of 45°, 90° and 180°, respectively. Various combinations of the levels represented at these three leads readily provides a full spectrum of 45° phase angles necessary to represent different data patterns as will be described in more detail hereinafter in connection with FIG. 3.

As depicted in FIG. 2, the aforementioned three-phase level outputs are applied as individual inputs to a comparator circuit 40 which monitors a divider circuit 50. A high-frequency source 45 which may have an output rate well in excess of the repetition rate of the incoming data feeds a high-frequency signal to the divider circuit 50. This divider circuit is arranged to translate the high-frequency output from source 45 to an intermediate frequency output which nevertheless is still much higher than the data input rate. It should be understood that the input data rate, the high frequency and intermediate frequency are not critical and may vary from application to application. Nevertheless it is essential that the divider circuit have an exceedingly fast input rate relative to the incoming data and a relatively fast output rate. The higher frequency output for the counter provides better signal resolution within each modulation period in that a large number of zero crossings are available. The intermediate frequency output of divider circuit 50 is applied to a filter and translating circuit 55. The translating circuit translates the signal down to a low frequency angle-modulated carrier signal, $f_o$, having angle, or phase, differences from one modulation period to next as shown by three representative samples in FIG. 5A. This low-frequency signal is applied to a send carrier line 65 which may be any leased or fortuitously selected telephone line as typical examples. The amplitude and delay characteristics for the carrier line are compensated for by a pair of narrow band-pass filters 60 and 80 and a fixed and/or variable equalizer 90. One typical such equalizer 90 is fully described in a concurrently filed application entitled "Equalization Circuit," having Ser. No. 709,608, and assigned to the same assignee as the present invention. The combination of the filters 60, 80 and the equalizer 90 form a communication link between the transmitter and the receiver locations which is a composite network having a linear phase and a narrow bandwidth. The bandwidth for 2,400 bits per second is about 800 Hz. with a center frequency, $f_o$, at 1,700 Hz. In instances where higher data rates, such as 4,800 bits per second are to be transmitted, it has been found desirable to utilize a band-pass pass filter which has a bandwidth of substantially 1,600 Hz. with its bandwidth also centered at 1,700 Hz. (the carrier frequency).

The data modulated low-frequency signal, after equalization by circuit 90, is applied to a translator and squaring circuit 115. A local high-frequency oscillator 95 is connected to the translator and squaring circuit 115, which circuit 115 also receives the equalized data modulated carrier, a representative signal shown, for example, as 110 in FIG. 5A. This translator circuit 115 translates the low-frequency data modulated carrier to a high-frequency signal such as 500, FIG. 5A, for application to a phase detector circuit 125.

A derived clock circuit 120 is connected to the output of the translator and squaring circuit 115. Circuit 120 is utilized to derive a clock signal from the envelope of the incoming data signal, and to emit a sample pulse 510, FIG. 5A, to logic gate 121. The phase detector circuit 125 will be described in full hereinafter. Briefly, however, phase changes representative of multibit groupings are presented as phase changes in high-frequency digital signals. These phase changes during a sampling period influence the output signal generated by a binary counter. Proper storage and comparison of the binary counter output from one modulation period to the next accurately dictates the phase differences from one data modulated signal to the next. The output from the phase detector 125, as was true in the transmitter channel may be any combination of three phases 45°, 90° and 180°, which phase combination is converted in a converter circuit 130, to digital levels representative of the original data.

Turning now to FIG. 3, a combined block diagram and circuit schematic of the digital modulator 25 is disclosed. Prior to discussing the circuit operation for the digital modulator 25, reference is again made to FIG. 3A wherein a suitable multibit word technique employing a differential eight-phase angle modulation scheme is depicted. The eight different values of multibit data patterns are encoded into eight different phase differences which are utilized to angle modulate a carrier signal during successive modulation periods. Each of the multibit data patterns depicted include ONES and/or ZEROS.

The phase angles are in phase increments of 45° and go from 0° to 315° for the eight different multibit data patterns. It should be noted that the particular code in FIG. 3A utilizes a ZERO as the middle bit in the three bit data pattern for angle values equal to or greater than 180° and similarly this midbit value is a ONE for angle values less than 180°. This invention recognizes the characteristic of the code and employs it to simplify to a marked degree the data logic necessary for conversion from digital level data patterns to phase levels in a manner which will be more fully described hereinafter.

A clock signal is applied at terminal 210 which clock signal is generally available from the digital data source 15, FIG. 2. This clock signal will have a repetition rate which is equal to the input data rate from the external source. Thus, if serial binary data at 2,400 bits per second is assumed applied to the modem of this invention, then the clock signal applied at terminal 210 will be a 2,400 Hz. clock. This clock signal is the shift signal for three tandem connected flip-flop stages 215, 220 and 225. Incoming serial data is received at terminal 211 and is stored at 215, 220 and 225 at the 2,400 bit per second rate. A plurality of NAND-gates 240 are connected to the various outputs of the flip-flops 215, 220 and 225.

A NAND gate truth table 250 is depicted which discloses that if all inputs to a NAND gate are "true" as represented, for example, by a plus 5 voltage input, then the output voltage is inverted, i.e., "false," as represented, for example, by a zero voltage value. If any combination of inputs are "false" and "-true," then the output is "true," i.e., plus 5 volts in the example given.

The conversion to a phase level from a three-bit input assumed for purposes of example to be 0–1–0 as shown in flip-flops 215, 220 and 225 results in "true" outputs from the "-zero" output terminal of flip-flops 215 and 225, and further results in a "true" output from the "one" output terminal at flip-flop 220. Thus three "true" conditions are supplied only to NAND-gate 240E. All other NAND gates in the plurality 240 receive combinations of "true" and "false" inputs. Accordingly, only the output of NAND-gate 240E is inverted to a "false" condition at the input of NOR-gate 261.

A NOR gate truth table 260 is included in FIG. 3 which indicates that if any one or all of the inputs is "false," the output is "true." Accordingly, NOR-gate 261 inverts the "false" output from NAND-gate 240E and emits a "true" or plus 5 input signal on the 45° angle lead 265. As mentioned hereinbefore, only three angle output leads, namely, leads 265, 266 and 267 each being representative of 45°, 90° and 180°, respectively, are required inasmuch as various combinations of these three angles provide the broad angle spectrum necessary for the eight differential phase code of FIG. 3A. For example, a combination of "true" inputs on leads 265 (45°) and 266 (90°) are indicative of an angle summation of 135°.

To pick another example, assume that the binary pattern is 1–1– in each of the shift registers 215, 220 and 225, thus making the "one" output terminals thereof "true." These "-true" terminals will satisfy the three "true" input conditions for NAND-gate 240D. NAND-gate 240D emits a "false" output to both NOR-gates 261 and 262 which "false" output is inverted by the NOR-gates 261, 262 so as to supply "true" inputs on both the 45° and 90° phase level leads 265 and 266.

Before considering further operations in the digital modulator 25, including the role of comparator circuit 270, an additional feature of the decoding process may be noted. The center flip-flop 220 continually stores the middle bit in the three bit data pattern groups. This middle bit is either a ZERO or a ONE and as mentioned hereinbefore, the presence of a ZERO denotes an angle equal to or greater than 180°, and the presence of a ONE denotes an angle of less than 180°. Considering first those angles 180° or more, the middle bit designation of a ZERO is present in the flip-flop 220 and thus an output lead 267 representative of a 180° phase is connected directly to the "zero" output terminal of flip-flop 220. Such a connection is thus "true," or a plus 5 voltage, whenever a ZERO is present in the flip-flop 220. Delivery of a "true" signal to comparator 270 on the 180° phase level line 267 by this direct connection considerably reduces the amount of the decoding logic necessary and yields an improved simple efficient circuit arrangement.

It should be noted in the operation described hereinbefore that various phase levels are continually present on the phase level leads 265, 266 and 267 as serial binary data is continually shifted into the flip-flops 215, 220 and 225. Although continually present as levels on these phase indicating leads, the comparison for the digital modulator circuit 25 takes place only after a three-bit data pattern has been stored in the flip-flops 215, 220, 225. Thus, the comparison is at a modulation rate which, in this instance, is one-third that of the incoming data rate. This comparison is controlled by a divider circuit 230 which is connected to the clock terminal 210 and is operative to divide the clock rate by 3. The output of the divider circuit 230 toggles a multivibrator 245 which is synchronized with an output from oscillator 280 so as to selectively control the logic circuitry 290. This selective enablement of the logic circuit 290 is operative in conjunction with an output from comparator 270 to obtain the required changes in phase in a reliable, simple and highly accurate manner through the employment of a high-frequency oscillator 280 and divider circuit 295. Circuit 295 is a divide-by-16 circuit. This divider circuit 295 includes four distinct divide-by-two circuits connected in tandem.

Figure 4:
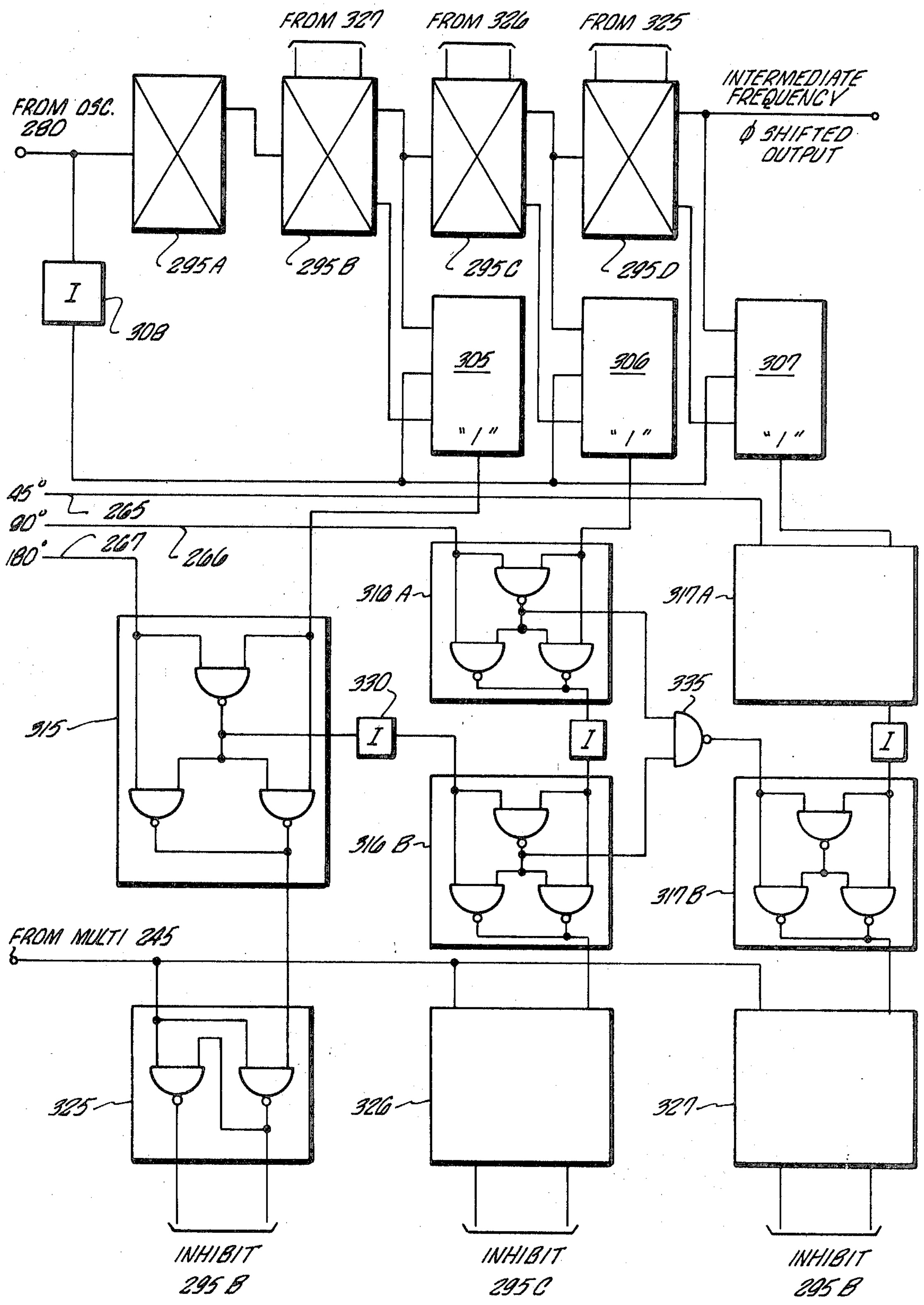
FIG. 4 is a combined block diagram and circuit schematic in more detail of a divider and logic circuitry achieving the phase-shifted signals of this invention.
Figure 4A:
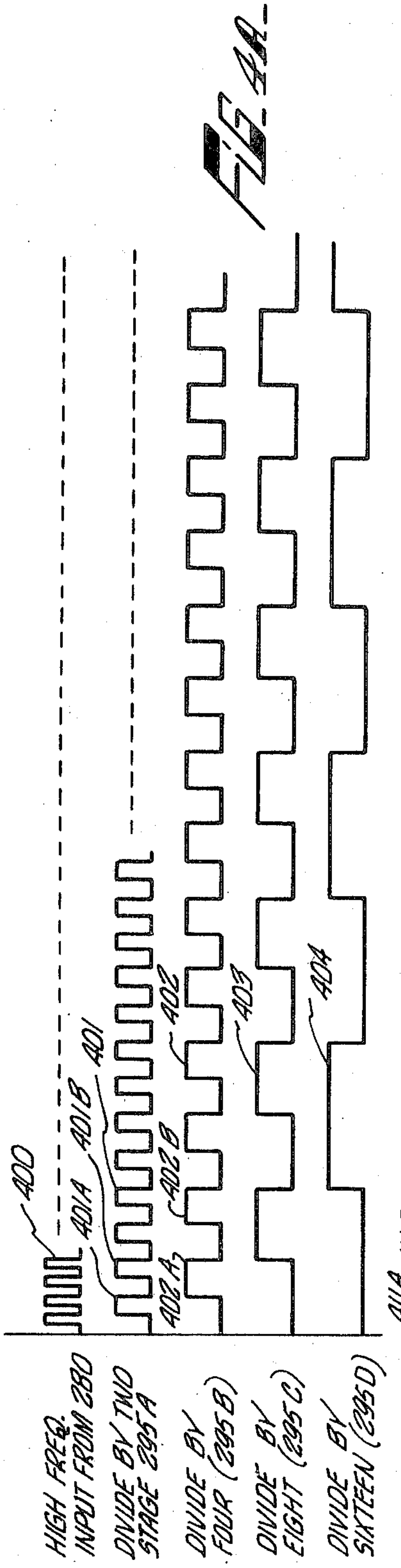
FIG. 4A is a pulse and waveform chart useful in promoting a clearer understanding of the divider of FIGS. 3 and 4.
Figure 4B:
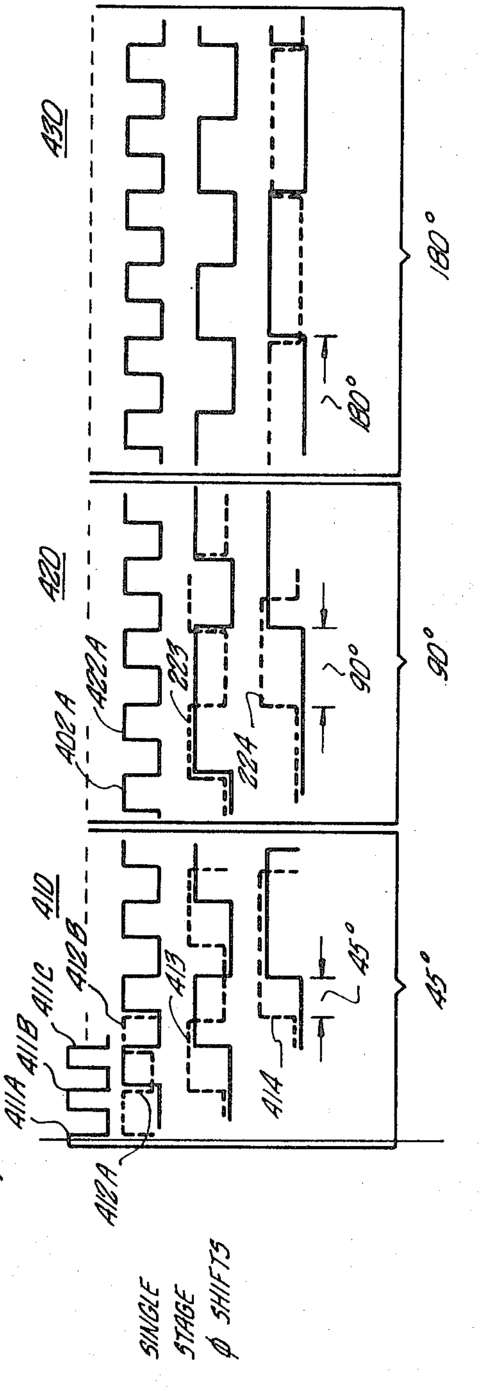
FIG. 4B is a pulse and waveform chart useful in promoting a clearer understanding of the manner in which digital signals are shifted in phase for different phase angles.

Reference will now be made to FIGS. 4A and 4B in order to disclose the manner in which the divide-by-16 counter 295 accomplishes its division and phase shifting operation. Waveform 400 in FIG. 4A depicts the output signal from oscillator 280. Each output from divider stages 295A through 295D of FIG. 4 is depicted in FIG. 4A by pulse trains 401 through 404, respectively. A comparison between pulse trains 400 and pulse train 401 readily indicates that the first divide-by-two stage 295A effects, for each pulse form oscillator 290, a 180° phase shift and halves the frequency rate. In a similar manner each succeeding pulse train, as compared to the preceding pulse train, also receives a 180° phase shift and halves the frequency rate of the preceding pulse train.

Since divider state 295D in FIG. 4 is the output stage for divider circuit 295, the output rate of this output stage determines the output frequency. Although each succeeding pulse train relative to the preceding pulse train is subjected to a 180° phase shift, it will become apparent hereinafter from an analysis of the wave trains in FIG. 4B that a single-phase shift in any of the last three divider stages 295B, 295C or 295D will respectively represent a phase shift of 45°, 90° or 180°, respectively, in the output frequency waveform.

To appreciate these phase shifts of 45°, 90° and 180°, reference is made to the similarly labeled wave train groups of FIG. 4B. The wave train group 410 (45°) includes instantaneous samples of the wave trains 401, 402, 403 and 404 from FIG. 4A. Each of the dashed wave trains in the group 410 depict the normal divider action which is achieved by the last three stages in the divider circuit 295 as is readily understandable by comparison of the dashed wave forms with their similarly designated counterparts in FIG. 4A. The example depicted by the waveform group 410 is a 45° advance or positive phase shift; whereas, it is apparent that a negative 45° phase shift is another equally suitable alternative.

To appreciate the manner in which a 45° phase shift is obtained, reference is made to pulse train 411 of group 410 in FIG. 4B. In particular, reference is made to pulses 411A and 411B of pulse train 411. The trailing edge of pulse 411A is utilized as an input to stage 295B to trigger the divider stage and thus establish a leading edge at pulse 412A shown in dashed lines. Thus, if the divider of stage 295B is considered as a bistable device (as shown in FIG. 4) the trailing edge of pulse 411A sets the bistable device of stage 295B and the next trailing edge of pulse 411B resets the bistable device of stage 295B so as to complete the pulse 412A shown in dashed lines. In a similar manner the next trailing edge of 411C sets the bistable device 295B to establish a leading edge for pulse 412B shown in dashed lines.

In accordance with the divider operation of this invention, when it is required to achieve a 45° phase shift it is necessary to selectively inhibit the stage 295B so that, rather than responding to pulse 411A the stage 295B, is inhibited for the trailing edge of pulse 411A. In this manner stage 295B, in response to phase change output from comparator 270, is thereafter triggered by the next subsequently appearing trailing edge 411B, rather than trailing edge 411A. This inhibit operation which prevents triggering for one trailing edge accomplishes an 180° phase shift at the input of stage 295B in that the "down" level is maintained twice as long as usual. Stages 295C and 295D remain in their normal trailing edge triggering condition and thus the 180° phase shift is divided to a 90° phase shift by divider stage 295C (see dashed lines 413 in comparison to the solid line), and is further divided to a 45° phase shift by stage 295D (see dashed line 414 in comparison to the solid line). The output from stage 295D is thus the local oscillator frequency divided by sixteen (i.e., the intermediate frequency) and it includes the desired 45° phase shift.

From the foregoing analysis of a desired 45° phase shift, it is apparent that each divider stage not only divides the frequency by two, but any induced phase shift previous to that divider stage is likewise divided by two. Accordingly, when it is desired to achieve a 90° phase shift, (group 420 FIG. 4B) an output signal from comparator 270, FIG. 3, indicative of a required 90° change in phase shift is applied to the divider stage 295C. The phase-change command from comparator 270 inhibits triggering by that divider stage 295C for one trailing edge of the input waveform. Thus, as shown by wave group 420, one trailing edge of pulse 422A is ignored by the divider stage 295C and it holds its state until the next trailing edge of pulse 422B is received by divider stage 295C. The dashed waveforms 223 and 224 show a phase shift at the output terminal 255 of 90°. Group 430 shows a 180° phase change as previously discussed.

The foregoing description involved phase shifts achieved by inhibiting a single-divider stage from among the divider stages 295B, 295C and 295D. This single stage inhibit operation is satisfactory for any one of the phase shift increments such as 45°, 90° or 180°. However, when it is necessary to effect a desired phase shift increment other than the three examples given, it is only necessary in accordance with the principles of my invention as depicted in part by the circuitry of FIG. 4, to simultaneously inhibit more than one divider stage of the divider stages 295B, 295C and 295D. Reference to FIG. 4 depicts the logic gates which are necessary to achieve either of the aforegoing described single-stage or multiple-stage inhibit operations.

In FIGS. 3 and 4, the outputs from divider stages 295B, 295C and 295D are stored in temporary storage registers 305, 306 and 307. An inverter 308 is connected to the input lead 280 so as to supply pulses to the temporary storage during the leading edge of each one of the pulses of pulse train 401 shown in FIG. 4A. An output from each one of the temporary storage stages 305 through 307 is applied to an associated set of comparison gates 315, 316A, and 317A, respectively. Each of the output comparison gates 315, 316B and 317B are connected to a trigger gate 325, 326 and 327 which trigger gates also receive an output from multivibrator 245 (FIG. 3). The output from multivibrator 245 at one-third the data rate, establishes a comparison time interval each time that three-data bits have been stored in the register stages of 215, 220 and 225 of FIG. 3. The NAND gate truth table of FIG. 3 may be applied to the NAND gates shown in detail in each outline of the comparison gates 315, 316 and 317 and in the trigger gate outline of gate 325 to show that any one of the phase shifts indicated at a "true" level on any one of phase level leads 265, 266 or 267 will emit from the proper one of trigger gates 325 through 327 a pair of inhibit signals for the stage of register 295 that they control. If a phase shift other than 45°, 90° or 180°, is required, then an inverter circuit 330 which is connected between comparison gate 315 and 316B achieves an inhibit operation on at least one additional stage.

In a similar manner, a NAND-gate 335 is connected between comparison gate 316A, 316B and comparison gate 317B so as to achieve a full 315° shift, as "true" conditions are applied to all of the shift level leads 265 through 267. Any required combination of phase-shifted signals is thus handled by the comparison and trigger gates shown in FIG. 4. The detailed operation of the various gates and the inverter circuit connections is not deemed necessary inasmuch as the operations will be readily understood by those skilled in the art with reference to the "truth" table 250, FIG. 3, for the NAND gates of FIG. 4.

As it will be recalled by reference to FIG. 2, the intermediate frequency output with appropriate phase shifts indicative of the information represented thereby, is applied to a filter and translator circuit 55. The intermediate frequency as described hereinbefore may be as high as 20.9 Hz. This high-frequency signal is not suitable for the signal format defined for the narrow band-pass filters 60 and 80 and, thus, it is translated down to a differential phase-modulated carrier of 1,700 Hz. for transmission over the communication link.

At the receiver of FIG. 2, the information-representing 1,700 Hz. signal is received, narrow band-pass filtered and applied to a fixed and/or variable equalizer 90. A high-frequency oscillator 95 at the receiver station translates the low-frequency signal from the equalizer circuit 90 back to an intermediate frequency signal, which intermediate frequency signal is applied to a sample gate 121.

Figure 5A:
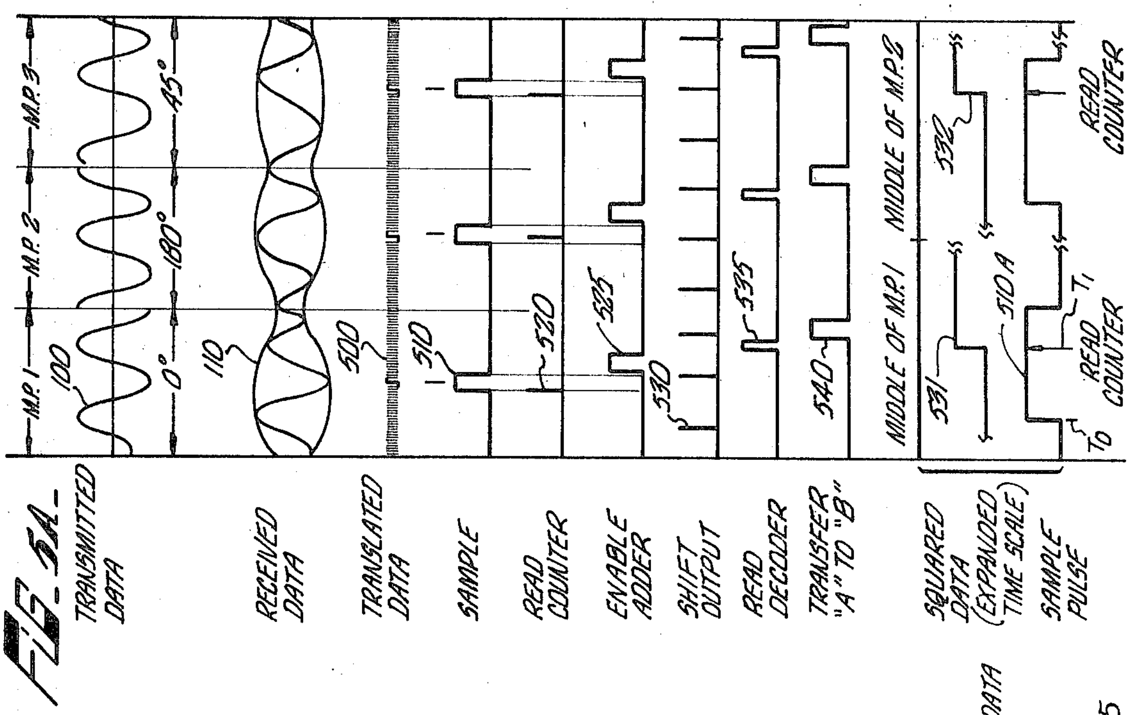
FIG. 5A is a pulse and waveform chart useful in promoting a clearer understanding of both the transmitter and receiver operations.
Figure 5:
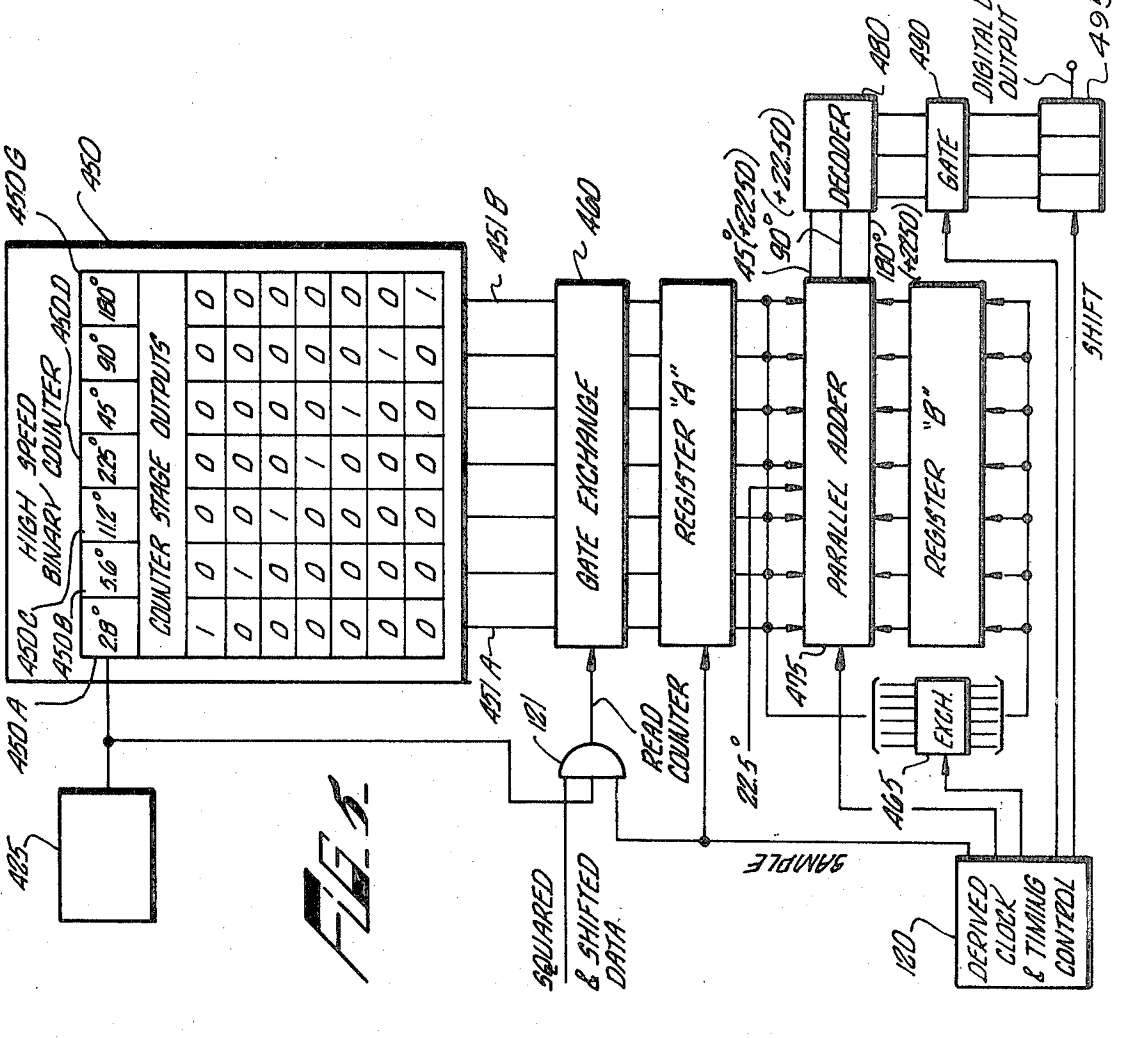
FIG. 5 is a block diagram of the phase detector at the receiver in accordance with the principles of this invention.

Sample gate 121 is repeated in FIG. 5. As there shown, in addition to the intermediate frequency phase shifted signal, sample gate 121 receives a sample pulse from the data derived clock source 120 and a synchronizing pulse from another high frequency stabilized oscillator 425. The sample pulse 510, FIG. 5A, is a precisely controlled interval and it selects from the intermediate frequency signal only that portion of the signal which contains the phase shift to be ascertained.

In FIG. 5, the highly stabilized oscillator 425 has a frequency output in the MHz. range; oscillator 425 drives a high-speed binary counter 450 which includes counter stages 450A through 450G. Each stage has associated therewith the angle output in degrees shown within each of the seven stages. This high-speed binary counter 450 is capable of emitting in succession within any one sample period all of the angle amounts indicated in the seven stages 450A through 450G and any progressive summation thereof.

The counter outputs 451A through 451G are applied to a gate exchange 460. This gate exchange 460 may be any well-known gate exchange of the prior art which responds to a READ counter signal 520, FIG. 5A applied to exchange 460 by the output of sampling gate 121. When enabled by an output from sample gate 121, gate exchange 460 reads the counter output at that instant in time and stores it in Register A which may be any well-known storage register.

Reference to FIG. 5A further indicates the timing sequence for a demodulating operation of FIG. 5 in accordance with my invention. Pulse train 500 is the 20.9 kHz. intermediate frequency and, of course, no attempt is made to precisely indicate the phase change which occurs at the middle of the modulation periods designated as M.P.1, M.P.2, M.P.3, etc. Clock source 120 emits a sample pulse 510 precisely at the middle of the modulation period, which sample pulse 510 brackets, by its duration, the amount of time necessary for at least one 360° phase change amount to take place. Inasmuch as oscillator 425 is also connected to sample gate 121, the sample pulse 520 is emitted by gate 121 at the first positive transition of the output pulse from the stabilized oscillator 425 which is coincident with a negative to positive level transition in the intermediate frequency input signal as will be more fully described hereinafter with respect to the expanded time scale waveforms of FIG. 5A.

In accordance with the foregoing, the phase shift to be ascertained is bracketed by sample pulses 520. If it is assumed that the counter output signal stored in Register A is the only signal present and if it is assumed that Register B is clear (i.e., free of any count at the beginning of a demodulation operation) then parallel adder 475 receives only the count from Register A.

Adder 475 also receives a 22.5° angle as a constant offset amount. This constant offset amount of 22.5° is continually added to the output count from Register A, and serves to guard against possible erroneous readings at any multiple of 45°. To explain, assume that an offset is not provided and that a 0° phase shift has been detected. A 0° phase shift, as one illustrative example, may be indicated at all "0" outputs from the stages of counter 450. If a 22.5° offset is provided, then the output signal from the parallel adder 475 for a 0° phase shift is 0001000. In this instance, a +2.8° phase shift would result in an output of 1001000; and a −2.8° phase shift would result in an output of 1110000. It should be noted that in the angle offset example, the last three and most significant bit positions remain constant for low order phase shifts. This technique thus significantly detracts from excessive counter activity, and reduces any possibility of ambiguities and errors for low order changes.

In FIG. 5A two illustrative phase shift signals 531 and 532 are shown in expanded time scale with the understanding that they are but a very small portion of a modulation period signal, which small portion appears at the midpoint of each successive modulation period. The leading edge of a sample pulse 510A also shown in expanded time scale, occurs at $T_o$, which is the midpoint of a modulation period as described hereinbefore. This leading edge at $T_o$ may also be employed to clear Register A via lead 464 in any well-known manner. At time $T_1$, the data signal 531 goes from a low to a high condition and at the next leading edge output from high-frequency oscillator 425, a read counter pulse 520 is emitted from gate 121 so as to enable gate exchange 460. Thus at time $T_1$ the output from counter 450 is stored in Register A. Subsequently, an output pulse 525 from timing control 120 enables the parallel adder 475 to perform a well-known parallel adder operation. The conversion of a binary count by a parallel adder is a well-known principle and many suitable circuits are readily available to convert a seven level input such as that of Register A into any desired three output combinations such as the outputs representative of various combinations of 45°, 90° and 180°. The three phase-representing outputs are applied to a decoder 480. This decoder 480 is essentially the inverse of that described in connection with the circuitry of FIG. 3 and thus need not be described in any further detail here.

The above-described adder operation subtracts the output count from Register B from the output count of Register A (plus the 22.5° constant offset amount). The difference in counts is then supplied to a decoder as 0°, 45°, 90°, etc., Again in an operation which is essentially the reverse of the circuit operation of FIG. 3, the adder outputs are decoded in decoder 480 which has its parallel output terminals applied to a gate circuit 490. Upon command from the timing control of source 120, gate 490 is enabled by an enabling pulse 535, FIG. 5A. Thus, decoder 480 is read out and stored in a three-stage shift register 495. A shift signal 530 shown in FIG. 5A converts the parallel data stored in register 495 back to its original series data output.

After the decoder output has been read, timing control 120 delivers a transfer "A" to "B" pulse 540, FIG. 5A to the gate exchange 465 which serves to place the count from Register A into Register B where it will be available for a subsequent comparison with the next data sample taken in accordance with the foregoing described operation which is repeated for each modulation period.

Since the 22.5° offset is always present, it is readily apparent that it does not in any way detract from the difference signals obtained by parallel adder 475.

The subject invention has been described with reference to certain preferred embodiments; it will be understood by those skilled in the art to which this invention pertains that the scope and spirit of the appended claims should not necessarily be limited to the embodiments described.

We claim:

1. In a data transmission system for sending digital data between a transmitter and a receiver over a transmission link wherein the digital data is represented by a carrier signal which is differentially phase modulated during successive modulation periods, a demodulator at the receiver which comprises:

counting means for producing an output signal which varies with time at a fixed repetition rate;

means responsive to receipt of the carrier signal for generating a sample signal during each modulation period; and means responsive to the phase of the modulated carrier signal and to the sample signal for reading output signals from the counting means during successive modulation periods to obtain the phase difference between the modulated signal occurring at adjacent modulation periods.

2. The demodulator as defined in claim 1 wherein the reading means includes a pair of registers for storing the output signal from the counting means and means for comparing the signals stored in the registers.

3. The demodulator defined in claim 2 including means for translating the received carrier signal to a squared intermediate frequency signal, and means for applying the squared intermediate signal to the comparing means.

4. The demodulator defined in claim 3 wherein the sample has a duration of about one cycle of the intermediate frequency signal and occurs at about the middle of each modulation period.

5. In a data transmission system for transmitting digital data between a transmitter and a receiver over a transmission link, the combination which comprises:

modulating means at the transmitter for generating a phase modulated carrier signal in which the phase of the carrier signal between adjacent modulation periods is representative of preselected digital data combinations and the envelope of the carrier signal has an amplitude modulation representative of a clock signal;

means at the transmitter for applying the phase modulated carrier signal to the transmission link;

means at the receiver for translating the carrier signal to a square wave intermediate frequency signal;

means at the receiver responsive to the envelope of the carrier signal for deriving a clock signal in synchronism with the modulation periods of the carrier signal;

means at the receiver responsive to the clock signal for generating a sample signal at substantially the center of each modulation period;

counting means at the receiver for producing an output signal which varies with time;

comparing means at the receiver responsive to the square wave intermediate frequency signal and to the sample signal for comparing the output signal of the counting means during successive modulation periods to provide an output signal which is a measure of the phase difference between the modulated signal occurring at adjacent modulation periods; and means responsive to the last named means and to the clock signal for generating a digital signal represented by the phase difference of the modulated signal during adjacent modulation periods.

6. The combination as defined in claim 5 wherein the modulator includes:

a high frequency oscillator;

a divider network consisting of at least three sections coupled to the high frequency oscillator for providing an intermediate frequency output signal; and means coupled to the divider network and responsive to the digital data to be transmitted for simultaneously inhibiting one or more of said three sections of the divider to provide a predetermined phase shift at the center of each modulation period of the intermediate frequency output signal which is representative of the digital data to be transmitted.

7. The combination as defined in claim 5 wherein the counting means is a high-speed binary counter and wherein the comparing means includes:

a first register;
a second register;
a parallel adder;
means for applying the output of the binary counter to the first register in response to the square wave intermediate frequency signal and to the sample signal;
means for applying the signals stored in the first and second registers to the parallel adder after the first register has received the output signal from the counter;
means for transferring the signal in the first register to the second register after the parallel adder has received the signals stored in the first and second registers.

8. In a data transmission system for sending digital data between a transmitter and a receiver over a transmission link by establishing predetermined phase differences in a carrier signal during successive modulation periods representative of preselected data combinations, a modulator at the transmitter which comprises:
a high frequency oscillator,
a divider network consisting of at least three sections coupled to the high frequency oscillator for providing an intermediate frequency output signal, and
means coupled to the divider network and responsive to the digital data to be transmitted for simultaneously inhibiting one or more of said three sections of the divider to provide a predetermined phase shift at the center of each modulation period of the intermediate frequency output signal which is representative of the digital data to be transmitted.

9. The combination as defined in claim 8 wherein the last named means includes:
register means responsive to the digital data to be transmitted for storing three binary bits of data during each modulation period; and
comparing means coupled to the divider network for comparing the data in the register means with the state of said three sections of the divider once each modulation period.

10. In a data transmission system for sending digital data between a transmitter and a receiver over a transmission link by establishing predetermined phase differences in a carrier signal during successive modulation periods representative of preselected data combinations, a demodulator at the receiver for detecting said phase differences to restore the digital data to its original format which comprises:
means responsive to the modulated carrier signal to produce a high frequency signal having the same phase relationship between adjacent modulation periods as the carrier signal,
counting means for producing an output signal which varies with time,
storage means for storing an output signal from the counting means,
comparing means responsive to the phase of the high frequency signal during a preselected portion of each modulation period for comparing the output signal from the counting means with the signal stored in the storage means to provide an output signal representative of the phase difference between the modulated carrier signal occurring at adjacent modulation periods, and
means for applying the compared output signal from the counting means to the storage means.

11. In a data transmission system for sending digital data between a transmitter and a receiver over a transmission link wherein the digital data is represented by a carrier signal which is differentially phase modulated during successive modulation periods, a demodulator at the receiver which comprises:
counting means for producing an output signal which varies at a fixed and predetermined counting rate;
means for generating a sample signal during a precise portion of each successive modulation period, which portions each coincide with the phase of the carrier that represents the data present during such modulation periods;
means responsive to the phase of the modulation carrier signal and to the sample signal for reading the output signal of the counting means during the presence of the sample signal in each of such successive modulation periods; and
means for comparing the reading from the counting means to provide an output signal which is a measure of the phase difference between the modulation signal occurring at adjacent modulation periods.

12. The demodulator as defined in claim 11 wherein the reading means includes a pair of registers, one each of said pair being operative for storing an output signal read from the counting means in adjacent modulation periods.

13. The demodulator in claim 11 wherein the counting means is a binary counter emitting a plurality of binary signals for each count, said binary signals each being associated with a predetermined phase angle.

14. The demodulator in claim 13 wherein the phase of the carrier is represented by a signal transition during the sample period and said reading means further comprising:
coincidental gating means responsive to said signal transition during the presence of said sample pulse for gating the binary output signal from the counting means into one of said registers simultaneously with said signal transition.

15. The demodulator of claim 14 further comprising:
means for transferring the binary signal stored in said one register into the other register of said pair prior to the appearance of the next upcoming sample pulse in the subsequent modulation period.

16. The demodulator in claim 15 wherein said comparing means comprises a:
comparison circuit connected between said register pair for comparing the binary signals stored in said register.

17. The demodulator in claim 16 wherein the comparison circuit comprises:
a parallel binary adder for emitting signals indicative of the phase angle difference between the binary counts read for two adjacent modulation periods.

18. The demodulator in claim 17 further comprising:
a phase angle decoder connected to receive signals emitted by said adder for converting said phase angle difference back to said binary data format represented thereby.

19. The demodulator in claim 17 and further comprising means for continually applying to said adder a signal indicative of a constant phase angle.

20. The demodulator in claim 19 wherein said constant phase angle is approximately one-half of the amount of the smallest differential phase angle amount.

21. In a data transmission system for sending digital data between a transmitter and a receiver over a transmission link by establishing predetermined phase differences in a square wave carrier signal during successive modulation periods representative of preselected equal groups of bits of data, a modulator at the transmitter which comprises:
means for receiving and successively grouping into equal multibit patterns the bits of data received from a data source;
decoding means connected to said data receiving means for emitting a signal representative of a predetermined phase angle identifying the bit pattern of each multibit group;
a high frequency oscillator;
a divider network coupled to the high frequency oscillator for providing a phase stable intermediate frequency square wave output signal unless commanded to selectively alter its phase at a particular instant;
a phase comparison circuit coupled between the decoding means and the divider network to compare the output signal of the decoder means, with an output signal from the divider network for emitting a signal indicative of a required change in phase for the intermediate frequency output signal; and
means connected to the date receiving means and to the high frequency oscillator for gating into said divider network a phase change command signal from said phase comparison circuit substantially simultaneously with said data decoding operation.

22. A modulator in accordance with claim 21 wherein said carrier signal is modulated with eight phases of various multiples of 45° angles and wherein each of said multibit groupings comprises three binary bits.

23. A modulator in accordance with claim 22 wherein said decoding means includes three output leads for emitting signals on any one or all of said leads, which signals on said leads are indicative of 45°, 90° and 180°.

24. A modulator in accordance with claim 21 wherein said gating means comprises:

normally disabled logic gating means connected between the output of said comparison circuit and input leads to said divider network, said gating means being adapted for selective enablement upon application thereto of an enabling signal; and means responsive to an oscillator pulse immediately subsequent to the phase change signal emitted by said phase comparison circuit for applying an enabling signal to said logic gating means.

25. In a data transmission system for sending digital data between a transmitter and a receiver over a transmission link by establishing zero through seven multiples of 45° phase angle differences in a square wave carrier signal during successive modulation periods, with said angle multiples being representative of groups of three bits of binary data of various patterns, a modulator at the transmitter which comprises:

means for receiving and successively grouping into equal three-bit words the bits of random data received from a data source;

decoding means connected to said data receiving means for emitting the predetermined phase angle identifying the bits of each multibit group;

a high frequency oscillator;

a divider network coupled to the high frequency oscillator for providing at its output a phase stable intermediate frequency square wave output signal until commanded to selectively alter its phase at a particular instant;

a phase comparison circuit coupled between the decoding means and the divider network to compare the output signal of the decoding means, with an instantaneous phase present in the divider network for emitting a phase change command signal indicative of a required change in phase for the intermediate frequency output signal emitted by the divider network; and means connected to the data receiving means and to the high-frequency oscillator for gating into said divider network a phase change command signal from said phase comparison circuit substantially simultaneously with said data decoding operation.

* * * * *